(12) United States Patent
Fan

(10) Patent No.: US 11,476,977 B2
(45) Date of Patent: Oct. 18, 2022

(54) DATA TRANSMISSION METHOD AND RELATED DEVICE

(71) Applicant: HUAWEI TECHNOLOGIES CO., LTD., Shenzhen (CN)

(72) Inventor: Yong Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 17/073,438

(22) Filed: Oct. 19, 2020

(65) Prior Publication Data

US 2021/0037098 A1 Feb. 4, 2021

Related U.S. Application Data

(63) Continuation of application No. PCT/CN2019/080823, filed on Apr. 1, 2019.

(30) Foreign Application Priority Data

Apr. 23, 2018 (CN) .......................... 201810369971.1

(51) Int. Cl.
*H04L 69/04* (2022.01)
*H04L 1/00* (2006.01)
(Continued)

(52) U.S. Cl.
CPC .......... *H04L 1/0061* (2013.01); *H04L 1/1607* (2013.01); *H04L 67/06* (2013.01); *H04L 69/04* (2013.01)

(58) Field of Classification Search
CPC ........ H04L 1/0061; H04L 67/06; H04L 69/04
See application file for complete search history.

(56) References Cited

U.S. PATENT DOCUMENTS 7,203,372 B1 * 4/2007 Chen .................. H04N 19/93
375/E7.144
8,707,141 B1 * 4/2014 Zhang ................ H03M 13/353
714/752

(Continued)

FOREIGN PATENT DOCUMENTS

CN 101782921 A 7/2010
CN 101945207 A 1/2011
(Continued)

OTHER PUBLICATIONS

Lkhagvasuren et al, "Multi-level Byte Index Chunking Mechanism for File Synchronization", International Journal of Software Engineering and Its Applications, vol. 8, No. 3, pp. 339-350. (Year: 2014).*

(Continued)

*Primary Examiner* — Viet D Vu
(74) *Attorney, Agent, or Firm* — Rimon PC

(57) ABSTRACT

A data transmission method and a related device are provided. In various embodiments a first device generates a two-dimensional index table based on a preset multi-thread sequence traversal algorithm and a size of target data that needs to be transmitted, where the two-dimensional index table is used to indicate a storage location of each piece of data in the target data. In those embodiments, the first device performs data reconstruction on the target data based on the two-dimensional index table to obtain a two-dimensional data block pool, where the two-dimensional data block pool includes a plurality of data blocks, and each data block corresponds to one pair of coordinates in the two-dimensional index table. Still in those embodiments, the first device obtains the plurality of data blocks through indexing by using the two-dimensional index table, and sending the plurality of data blocks to a second device.

20 Claims, 12 Drawing Sheets

(51) Int. Cl.
   *H04L 1/16*      (2006.01)
   *H04L 67/06*     (2022.01)

(56) References Cited

U.S. PATENT DOCUMENTS

| | | | | |
|---|---|---|---|---|
| 9,280,457 | B2* | 3/2016 | Goel | G06F 3/064 |
| 2003/0126201 | A1* | 7/2003 | Hoang | G11B 20/1217 |
| 2004/0123039 | A1* | 6/2004 | Berks | G06F 12/0871 |
| | | | | 711/133 |
| 2007/0124415 | A1* | 5/2007 | Lev-Ran | H04L 51/063 |
| | | | | 709/217 |
| 2008/0021914 | A1* | 1/2008 | Davies | G06F 16/221 |

FOREIGN PATENT DOCUMENTS

| | | |
|---|---|---|
| CN | 103019895 A | 4/2013 |
| CN | 103116555 A | 5/2013 |
| CN | 104753626 A | 7/2015 |
| CN | 105302550 A | 2/2016 |
| CN | 105677904 A | 6/2016 |
| CN | 105933412 A | 9/2016 |
| CN | 106528830 A | 3/2017 |
| CN | 108809514 A | 11/2018 |
| CN | 110784528 A | 2/2020 |
| WO | 2006071866 A2 | 7/2006 |
| WO | 2014201942 A1 | 12/2014 |
| WO | 2016061925 A1 | 4/2016 |
| WO | 2018037495 A1 | 3/2018 |

OTHER PUBLICATIONS

Xia et al, "Similarity and Locality Based Indexing for High Performance Data Deduplication", IEEE transactions on computers, vol. 64, No. 4, pp. 1162-1176. (Year: 2015).*

R. Fielding et al,"Hypertext Transfer Protocol—HTTP/1.1",Network Working Group, RFC 2616, Jun. 1999, total 114 pages.

* cited by examiner

DATA TRANSMISSION METHOD AND RELATED DEVICE

CROSS-REFERENCE TO RELATED APPLICATIONS

This application is a continuation of International Application No. PCT/CN2019/080823, filed on Apr. 1, 2019, which claims priority to Chinese Patent Application No. 201810369971.1, filed on Apr. 23, 2018. The disclosures of the aforementioned applications are hereby incorporated by reference in their entireties.

TECHNICAL FIELD

This application relates to the communications field, and in particular, to a data transmission method and a related device.

BACKGROUND

Data transmission is a basic communication service, and most computer services require the data transmission service. File transfer efficiency of a conventional file transfer protocol (FTP) server in a wide area network is low, a difference between a file transfer rate (approximately 300 KB/s) of an existing service system in the wide area network and a local file transfer rate (approximately 6 MB/s) of the service system is dozens of times, the file transfer rate in the wide area network cannot meet requirements for increasing services, and data transmission in the wide area network has become a bottleneck that hinders growth of a service system. Therefore, performance of the file transfer rate in the wide area network needs to be improved. Data transmission applications in the wide area network all face problems of a low bandwidth, an unstable connection, and heavy load existing when small files are transmitted in batches. To resolve the problems, a channel multiplexing mechanism is usually used to reduce a quantity of connections to efficiently transmit the small files in batches. However, for transmission of a large file, a data congestion problem occurs when a file whose size is greater than 1 G is uploaded or downloaded. For example, FIG. 1 is a schematic diagram in which a data congestion phenomenon occurs when a file whose size is greater than 1 G is downloaded.

In an existing solution, a linear file blocking solution is used to avoid congestion, and a hash tree manner is used to quickly identify whether file content is accurate, so as to ensure accuracy of the file content. For example, as shown in FIG. 2, a secure hash algorithm (SHA) is used to divide one piece of large file data with a data size of 6.5 MB into a plurality of pieces of small file data. A hash value has 256 bits, and further includes six pieces of small file data each with a size of 1 MB and one piece of small file data with a size of 0.5 MB.

However, because a size of a hash tree (a depth of the hash tree) is positively correlated to a size of a file, and a larger file indicates a larger size of the hash tree, a time for which the hash tree needs to be traversed to find a file block for identification is long, a directory traversal speed is slow, and search efficiency is low. In addition, when a transmission problem occurs, a time for retransmission is long, and data repair efficiency is low.

SUMMARY

Various embodiments provide a data transmission method and a related device, to improve a directory traversal speed and improve data search and data repair efficiency.

A first aspect of this application provides a data transmission method, including: generating, by a first device, a two-dimensional index table based on a preset multi-thread sequence traversal algorithm and a size of target data that needs to be transmitted, where the two-dimensional index table is used to indicate a storage location of each piece of data in the target data, and the target data may include one or more directories, a complex multi-level directory, a single file, or a plurality of files; performing, by the first device, data reconstruction on the target data based on the two-dimensional index table to obtain a two-dimensional data block pool, where the two-dimensional data block pool includes a plurality of data blocks, each data block corresponds to one pair of coordinates in the two-dimensional index table, and each data block has a different pair of coordinates in the two-dimensional index table; and obtaining, by the first device, the plurality of data blocks in the two-dimensional data block pool through indexing by using the two-dimensional index table, and sending the plurality of data blocks to a second device. The first device reconstructs the target data that needs to be transmitted, to obtain the two-dimensional data block pool. The first device can quickly determine each data block through locating based on the two-dimensional data block pool, and send the two-dimensional data block pool to the second device, such that data traversal duration is reduced, to improve data search efficiency and improve data transmission efficiency.

In one example design, in a first implementation of the first aspect of the embodiments of this application, the generating, by a first device, a two-dimensional index table based on a preset multi-thread sequence traversal algorithm and a size of target data that needs to be transmitted includes: traversing, by the first device based on the preset multi-thread sequence traversal algorithm, the target data that needs to be transmitted, to obtain a data directory, where the data directory includes at least one level of directory; determining, by the first device, a horizontal coordinate and a vertical coordinate of the two-dimensional index table based on the size of the target data and the at least one level of directory, where the vertical coordinate of the two-dimensional index table is used to indicate a quantity of groups of the target data, and the horizontal coordinate of the two-dimensional index table is used to indicate a quantity of data blocks corresponding to each group; and generating, by the first device, the two-dimensional index table, where the vertical coordinate of the two-dimensional index table is used to indicate the quantity of groups, and the horizontal coordinate of the two-dimensional index table is used to indicate the quantity of data blocks corresponding to each group. A process in which the first device generates the two-dimensional index table is refined, a specific implementation is provided, and an implementation of this application is added.

In one example design, in a second implementation of the first aspect of the embodiments of this application, a size of each data block is negatively correlated to a network delay; and a quantity of threads is positively correlated to a network bandwidth. The size of the data block and the quantity of threads are limited, and a relationship between the data block and the network delay and a relationship between the quantity of threads and the network bandwidth are specified. Therefore, the size of the data block and the quantity of threads can be quickly set, to improve data transmission efficiency.

In one example design, in a third implementation of the first aspect of the embodiments of this application, after the performing, by the first device, data reconstruction on the target data based on the two-dimensional index table, before the obtaining, by the first device, the plurality of data blocks through indexing by using the two-dimensional index table, and sending the plurality of data blocks to a second device, the method further includes: generating, by the first device, a check code of each data block, where the check code is used to check correctness of each data block. A process of generating the check code is added, to ensure accuracy of a to-be-transmitted data block.

In one example design, in a fourth implementation of the first aspect of the embodiments of this application, the data block includes header field information and content information; the header field information includes at least coordinates and a check code of the data block, and the coordinates are used to indicate a location of the data block in the two-dimensional data block pool; and the content information includes data content indicated by the header field information, and the data content is included in the target data. A structure of the data block is limited, and an implementation of the embodiment of this application is added.

In one example design, in a fifth implementation of the first aspect of the embodiments of this application, the method includes: if a first data block fails to be transmitted, receiving, by the first device, a retransmission request sent by the second device, where the retransmission request includes first coordinates of the first data block; determining, by the first device, a location of the first data block in the two-dimensional data block pool based on the first coordinates; re-obtaining, by the first device, the first data block based on the location of the first data block; and sending, by the first device, the re-obtained first data block to the second device. A process of repairing a data block that fails to be transmitted is added, and only the data block that fails to be transmitted is retransmitted, to reduce a data repair time, and improve data repair efficiency.

In one example design, in a sixth implementation of the first aspect of the embodiments of this application, when the target data includes a large file, and the large file includes a plurality of target data blocks, header field information of the target data blocks further includes first indication information, where the first indication information is used to indicate a location of each target data block in the large file, and the large file is formed after transmission is completed. The first indication information indicating that the large file is formed is added, such that after receiving the data block, the second device restores the plurality of data blocks to the large file based on the first indication information.

In one example design, in a seventh implementation of the first aspect of the embodiments of this application, when the target data includes a plurality of small files, and the plurality of small files form the target data block, header field information of the target data block further includes second indication information, where the second indication information is used to indicate a location of each small file included in the target data block, and the small files are obtained through division after transmission is completed. The second indication information indicating that the small file is formed is added, such that after receiving the data block, the second device restores the data block to the plurality of small files based on the second indication information.

In one example design, in an eighth implementation of the first aspect of the embodiments of this application, all data blocks have a same size. A size of each data block is limited, such that the obtained two-dimensional data block pool has a more proper structure, to facilitate a data search and improve data search efficiency.

In one example design, in a ninth implementation of the first aspect of the embodiments of this application, the data content is one or more target files; or the data content is a part of content of a target file. Data content included in each data block is limited, and the plurality of small files may be transmitted together, to improve data transmission efficiency.

In one example design, in a tenth implementation of the first aspect of the embodiments of this application, the header field information further includes a target path, a source file name, a target file name, a file offset address, and a data block size. Content included in the header field information of the data block is limited, such that steps in this application are more complete.

A second aspect of this application provides a data transmission method, including: receiving, by a second device, a plurality of data blocks sent by a first device, where each data block includes one pair of coordinates; generating, by the second device, a corresponding two-dimensional index table based on a plurality of pairs of coordinates, where the two-dimensional index table is used to indicate storage locations of the plurality of data blocks; and ranking, by the second device, each of the plurality of data blocks based on the two-dimensional index table, to obtain a two-dimensional data block pool, where data content included in data blocks in the two-dimensional data block pool forms target data that needs to be transmitted. The second device generates the two-dimensional index table based on the coordinates included in the plurality of received data blocks, and reconstructs the target data that needs to be transmitted, to obtain the two-dimensional data block pool. The second device can quickly determine each data block through locating based on the two-dimensional data block pool, and search the data block in the two-dimensional data block pool, such that data traversal duration is reduced, to improve data search efficiency and improve data transmission efficiency.

In one example design, in a first implementation of the second aspect of the embodiments of this application, the generating, by the second device, a corresponding two-dimensional index table based on coordinates includes: determining, by the second device, a vertical coordinate of the two-dimensional index table based on a second value in the coordinates, where the vertical coordinate of the two-dimensional index table is used to indicate a quantity of groups of the target data; determining, by the second device, a horizontal coordinate of the two-dimensional index table based on a first value in the coordinates, where the horizontal coordinate of the two-dimensional index table is used to indicate a quantity of data blocks corresponding to each group; and generating, by the second device, the corresponding two-dimensional index table based on the horizontal coordinate and the vertical coordinate. A process in which the second device generates the two-dimensional index table is refined, a specific implementation is provided, and an implementation of this application is added.

In one example design, in a second implementation of the second aspect of the embodiments of this application, a size of each data block is negatively correlated to a network delay; and a quantity of threads is positively correlated to a network bandwidth. The size of the data block and the quantity of threads are limited, and a relationship between the data block and the network delay and a relationship between the quantity of threads and the network bandwidth are specified. Therefore, the size of the data block and the quantity of threads can be quickly set, to improve data transmission efficiency.

In one example design, in a third implementation of the second aspect of the embodiments of this application, after the receiving, by a second device, a plurality of data blocks sent by a first device, before the generating, by the second device, a corresponding two-dimensional index table based on a plurality of pairs of coordinates, the method further includes: performing, by the second device, a check based on a check code carried in each data block, to determine correctness of each data block. A process of generating the check code is added, to ensure accuracy of a to-be-transmitted data block.

In one example design, in a fourth implementation of the second aspect of the embodiments of this application, the data block includes header field information and content information; the header field information includes at least coordinates and a check code of the data block, and the coordinates are used to indicate a location of the data block in the two-dimensional data block pool; and the content information includes data content indicated by the header field information, and the data content is included in the target data. A structure of the data block is limited, and an implementation of the embodiment of this application is added.

In one example design, in a fifth implementation of the second aspect of the embodiments of this application, the method includes: if a first data block fails to be transmitted, determining, by the second device, first coordinates of the first data block; sending, by the second device, a retransmission request to the first device, where the retransmission request includes the first coordinates; and receiving, by the second device, the first data block resent by the first device. A process of repairing a data block that fails to be transmitted is added, and only the data block that fails to be transmitted is retransmitted, to reduce a data repair time, and improve data repair efficiency.

In one example design, in a sixth implementation of the second aspect of the embodiments of this application, when the target data includes a large file, and the large file includes a plurality of target data blocks, header field information of the target data blocks further includes first indication information, where the first indication information is used to indicate a location of each target data block in the large file, and the large file is formed after transmission is completed. The first indication information indicating that the large file is formed is added, such that after receiving the data block, the second device restores the plurality of data blocks to the large file based on the first indication information.

In one example design, in a seventh implementation of the second aspect of the embodiments of this application, when the target data includes a plurality of small files, and the plurality of small files form the target data block, header field information of the target data block further includes second indication information, and the second indication information is used to indicate a location of each small file included in the target data block, and the small files are obtained through division after transmission is completed. The second indication information indicating that the small file is formed is added, such that after receiving the data block, the second device restores the data block to the plurality of small files based on the second indication information.

In one example design, in an eighth implementation of the second aspect of the embodiments of this application, all data blocks have a same size. A size of each data block is limited, such that the obtained two-dimensional data block pool has a more proper structure, to facilitate a data search and improve data search efficiency.

In one example design, in a ninth implementation of the second aspect of the embodiments of this application, the data content is one or more target files; or the data content is a part of content of a target file. Data content included in each data block is limited, and the plurality of small files may be transmitted together, to improve data transmission efficiency.

In one example design, in a tenth implementation of the second aspect of the embodiments of this application, the header field information further includes a target path, a source file name, a target file name, a file offset address, and a data block size. Content included in the header field information of the data block is limited, such that steps in this application are more complete.

A third aspect of this application provides a device, where the device is a first device and includes: a first generation unit, configured to generate a two-dimensional index table based on a preset multi-thread sequence traversal algorithm and a size of target data that needs to be transmitted, where the two-dimensional index table is used to indicate a storage location of each piece of data in the target data, and the target data may include one or more directories, a complex multi-level directory, a single file, or a plurality of files; a reconstruction unit, configured to perform data reconstruction on the target data based on the two-dimensional index table to obtain a two-dimensional data block pool, where the two-dimensional data block pool includes a plurality of data blocks, and each data block corresponds to one pair of coordinates in the two-dimensional index table; and a first sending unit, configured to: obtain the plurality of data blocks through indexing by using the two-dimensional index table, and send the plurality of data blocks to a second device. The first device reconstructs the target data that needs to be transmitted, to obtain the two-dimensional data block pool. The first device can quickly determine each data block through locating based on the two-dimensional data block pool, and send the two-dimensional data block pool to the second device, such that data traversal duration is reduced, to improve data search efficiency and improve data transmission efficiency.

In one example design, in a first implementation of the third aspect of the embodiments of this application, the first generation unit includes: a traversal module, configured to traverse, based on the preset multi-thread sequence traversal algorithm, the target data that needs to be transmitted, to obtain a data directory, where the data directory includes at least one level of directory; a determining module, configured to determine a horizontal coordinate and a vertical coordinate of the two-dimensional index table based on the size of the target data and the at least one level of directory, where the vertical coordinate of the two-dimensional index table is used to indicate a quantity of groups of the target data, and the horizontal coordinate of the two-dimensional index table is used to indicate a quantity of data blocks corresponding to each group; and a generation module, configured to generate the two-dimensional index table. A process in which the first device generates the two-dimensional index table is refined, a specific implementation is provided, and an implementation of this application is added.

In one example design, in a second implementation of the third aspect of the embodiments of this application, a size of each data block is negatively correlated to a network delay; and a quantity of threads is positively correlated to a network bandwidth. The size of the data block and the quantity of threads are limited, and a relationship between the data block and the network delay and a relationship between the quantity of threads and the network bandwidth are specified. Therefore, the size of the data block and the quantity of threads can be quickly set, to improve data transmission efficiency.

In one example design, in a third implementation of the third aspect of the embodiments of this application, the device further includes: a second generation unit, configured to generate a check code of each data block, where the check code is used to check correctness of each data block. A process of generating the check code is added, to ensure accuracy of a to-be-transmitted data block.

In one example design, in a fourth implementation of the third aspect of the embodiments of this application, the data block includes header field information and content information; the header field information includes at least coordinates and a check code of the data block, and the coordinates are used to indicate a location of the data block in the two-dimensional data block pool; and the content information includes data content indicated by the header field information, and the data content is included in the target data. A structure of the data block is limited, and an implementation of the embodiment of this application is added.

In one example design, in a fifth implementation of the third aspect of the embodiments of this application, the method includes: a receiving unit, configured to: if a first data block fails to be transmitted, receive a retransmission request sent by the second device, where the retransmission request includes first coordinates of the first data block; a determining unit, configured to determine a location of the first data block in the two-dimensional data block pool based on the first coordinates; an obtaining unit, configured to re-obtain the first data block based on the location of the first data block; and a second sending unit, configured to send the re-obtained first data block to the second device. A process of repairing a data block that fails to be transmitted is added, and only the data block that fails to be transmitted is retransmitted, to reduce a data repair time, and improve data repair efficiency.

In one example design, in a sixth implementation of the third aspect of the embodiments of this application, when the target data includes a large file, and the large file includes a plurality of target data blocks, header field information of the target data blocks further includes first indication information, where the first indication information is used to indicate a location of each target data block in the large file, and the large file is formed after transmission is completed. The first indication information indicating that the large file is formed is added, such that after receiving the data block, the second device restores the plurality of data blocks to the large file based on the first indication information.

In one example design, in a seventh implementation of the third aspect of the embodiments of this application, when the target data includes a plurality of small files, and the plurality of small files form the target data block, header field information of the target data block further includes second indication information, and the second indication information is used to indicate a location of each small file included in the target data block, and the small files are obtained through division after transmission is completed. The second indication information indicating that the small file is formed is added, such that after receiving the data block, the second device restores the data block to the plurality of small files based on the second indication information.

In one example design, in an eighth implementation of the third aspect of the embodiments of this application, all data blocks have a same size. A size of each data block is limited, such that the obtained two-dimensional data block pool has a more proper structure, to facilitate a data search and improve data search efficiency.

In one example design, in a ninth implementation of the third aspect of the embodiments of this application, the data content is one or more target files; or the data content is a part of content of a target file. Data content included in each data block is limited, and the plurality of small files may be transmitted together, to improve data transmission efficiency.

In one example design, in a tenth implementation of the third aspect of the embodiments of this application, the header field information further includes a target path, a source file name, a target file name, a file offset address, and a data block size. Content included in the header field information of the data block is limited, such that steps in this application are more complete.

A fourth aspect of this application provides a device, where the device is a second device and includes: a first receiving unit, configured to receive a plurality of data blocks sent by a first device, where each data block includes one pair of coordinates; a generation unit, configured to generate a corresponding two-dimensional index table based on a plurality of pairs of coordinates, where the two-dimensional index table is used to indicate storage locations of the plurality of data blocks; and a ranking unit, configured to rank each of the plurality of data blocks based on the two-dimensional index table, to obtain a two-dimensional data block pool, where the two-dimensional data block pool is target data that needs to be transmitted. The second device generates the two-dimensional index table based on the coordinates included in the plurality of received data blocks, and reconstructs the target data that needs to be transmitted, to obtain the two-dimensional data block pool. The second device can quickly determine each data block through locating based on the two-dimensional data block pool, and search the data block in the two-dimensional data block pool, such that data traversal duration is reduced, to improve data search efficiency and improve data transmission efficiency.

In one example design, in a first implementation of the fourth aspect of the embodiments of this application, the generation unit includes: a first determining module, configured to determine a vertical coordinate of the two-dimensional index table based on a second value in the coordinates, where the vertical coordinate of the two-dimensional index table is used to indicate a quantity of groups of the target data; a second determining module, configured to determine a horizontal coordinate of the two-dimensional index table based on a first value in the coordinates, where the horizontal coordinate of the two-dimensional index table is used to indicate a quantity of data blocks corresponding to each group; and a generation module, configured to generate the corresponding two-dimensional index table based on the horizontal coordinate and the vertical coordinate. A process in which the first device generates the two-dimensional index table is refined, a specific implementation is provided, and an implementation of this application is added.

In one example design, in a second implementation of the fourth aspect of the embodiments of this application, a size of each data block is negatively correlated to a network delay; and a quantity of threads is positively correlated to a network bandwidth. The size of the data block and the quantity of threads are limited, and a relationship between the data block and the network delay and a relationship between the quantity of threads and the network bandwidth are specified. Therefore, the size of the data block and the quantity of threads can be quickly set, to improve data transmission efficiency.

In one example design, in a third implementation of the fourth aspect of the embodiments of this application, the device further includes: a check unit, is configured to perform a check based on a check code carried in each data block, to determine correctness of each data block. A process of generating the check code is added, to ensure accuracy of a to-be-transmitted data block.

In one example design, in a fourth implementation of the fourth aspect of the embodiments of this application, the data block includes header field information and content information; the header field information includes at least coordinates and a check code of the data block, and the coordinates are used to indicate a location of the data block in the two-dimensional data block pool; and the content information includes data content indicated by the header field information, and the data content is included in the target data. A structure of the data block is limited, and an implementation of the embodiment of this application is added.

In one example design, in a fifth implementation of the fourth aspect of the embodiments of this application, the method includes: an obtaining unit, configured to: if a first data block fails to be transmitted, determine first coordinates of the first data block; a sending unit, configured to send a retransmission request to the first device, where the retransmission request includes the first coordinates; and a second receiving unit, configured to receive the first data block resent by the first device. A process of repairing a data block that fails to be transmitted is added, and only the data block that fails to be transmitted is retransmitted, to reduce a data repair time, and improve data repair efficiency.

In one example design, in a sixth implementation of the fourth aspect of the embodiments of this application, when the target data includes a large file, and the large file includes a plurality of target data blocks, header field information of the target data blocks further includes first indication information, where the first indication information is used to indicate a location of each target data block in the large file, and the large file is formed after transmission is completed. The first indication information indicating that the large file is formed is added, such that after receiving the data block, the second device restores the plurality of data blocks to the large file based on the first indication information.

In one example design, in a seventh implementation of the fifth aspect of the embodiments of this application, when the target data includes a plurality of small files, and the plurality of small files form the target data block, header field information of the target data block further includes second indication information, and the second indication information is used to indicate a location of each small file included in the target data block, and the small files are obtained through division after transmission is completed. The second indication information indicating that the small file is formed is added, such that after receiving the data block, the second device restores the data block to the plurality of small files based on the second indication information.

In one example design, in an eighth implementation of the fourth aspect of the embodiments of this application, all data blocks have a same size. A size of each data block is limited, such that the obtained two-dimensional data block pool has a more proper structure, to facilitate a data search and improve data search efficiency.

In one example design, in a ninth implementation of the fourth aspect of the embodiments of this application, the data content is one or more target files; or the data content is a part of content of a target file. Data content included in each data block is limited, and the plurality of small files may be transmitted together, to improve data transmission efficiency.

In one example design, in a tenth implementation of the fourth aspect of the embodiments of this application, the header field information further includes a target path, a source file name, a target file name, a file offset address, and a data block size. Content included in the header field information of the data block is limited, such that steps in this application are more complete.

A fifth aspect of this application provides a computer readable storage medium. The computer readable storage medium stores an instruction, and when the instruction is run on a computer, the computer is enabled to perform the method in the foregoing aspects.

A sixth aspect of this application provides a computer program product including an instruction. When the computer program product is run on a computer, the computer is enabled to perform the method in the foregoing aspects.

DESCRIPTION OF EMBODIMENTS

Various Embodiments provide a data transmission method and a related device, to improve a directory traversal speed and improve data search and data repair efficiency.

To make persons skilled in the art understand the technical solutions in this application better, the following describes the technical solutions in the embodiments of this application with reference to the accompanying drawings in the embodiments of this application.

Herein, the terms such as "first", "second", and the like are intended to distinguish between similar objects but do not necessarily indicate a specific order or sequence. Moreover, the terms "include", "have" and any other variants herein mean to cover the non-exclusive inclusion, for example, a process, a method, a system, a product, or a device that includes a list of steps or units is not necessarily limited to those units, but may include other units not expressly listed or inherent to such a process, a method, a product, or a device.

Currently, when a transmission bandwidth is 20 MB/s in a wide area network, a 2 GB large file is successfully transmitted above 2 MB/s. For example, utilization of an actual transmission bandwidth exceeds 80% during transmission from a place A to a place B in the wide area network. To ensure accuracy of a process of transmitting a large file in the wide area network, a linear file blocking solution is used in an existing solution, and a hash tree manner is used to ensure accuracy of file content. However, in this solution, as a file size increases, duration required for traversal is longer, and more hardware resources are consumed.

Figure 1:
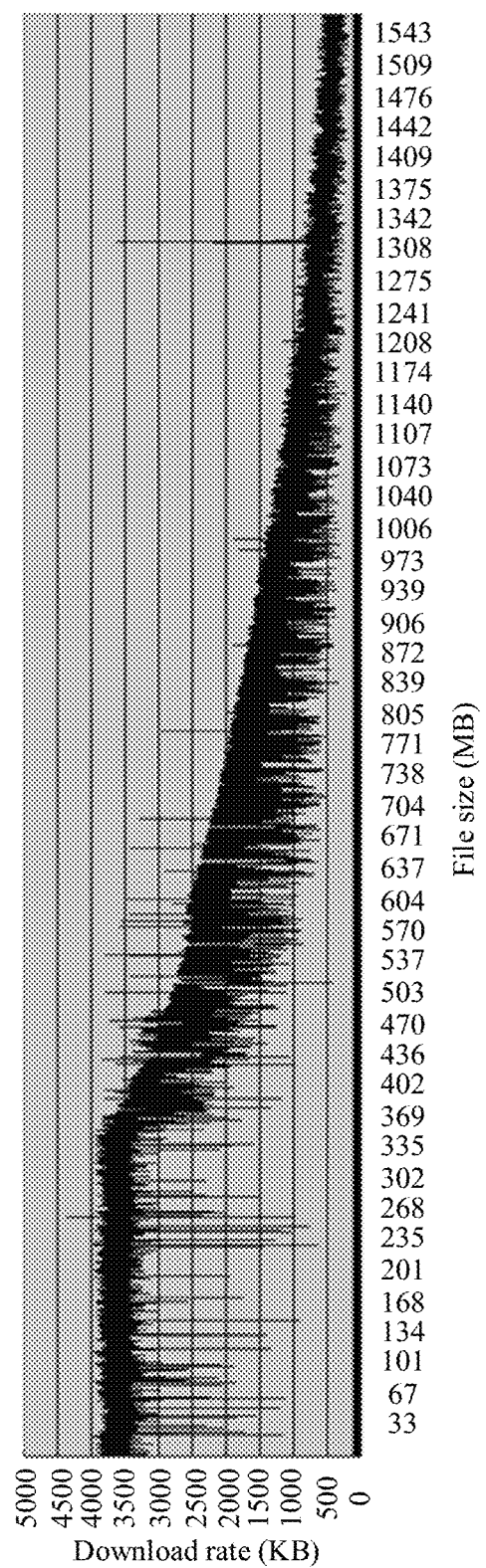
FIG. 1 is a schematic diagram of a relationship between a download rate and a file size in a data download process.
Figure 2:
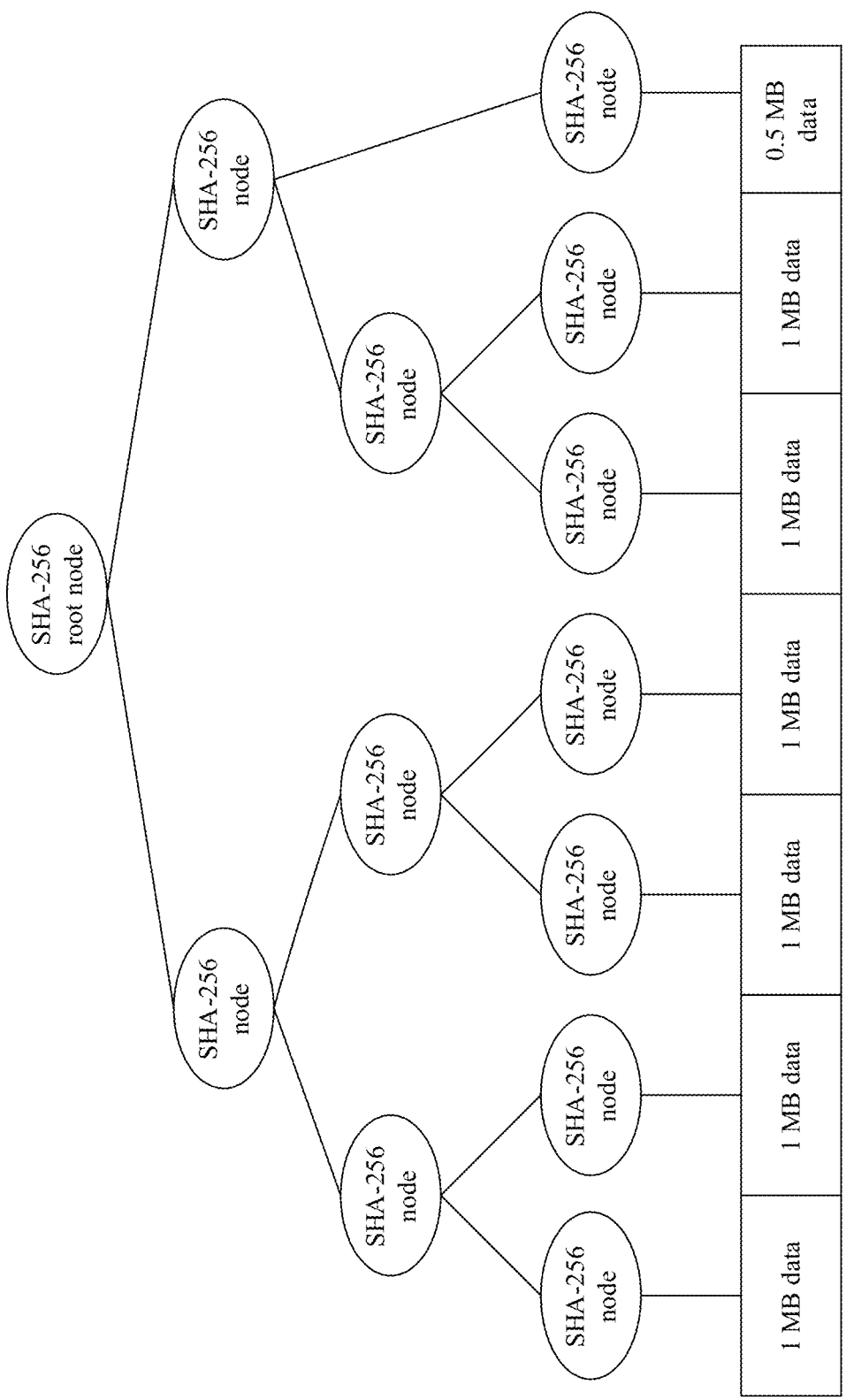
FIG. 2 is a schematic diagram of a hash tree obtained by using an SHA-256 algorithm.
Figure 3:
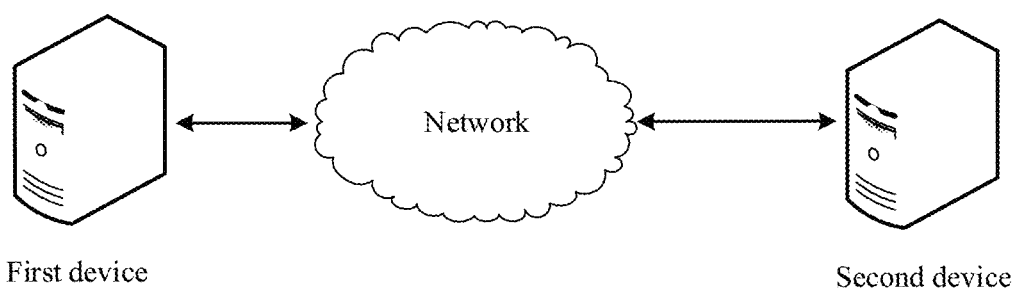
FIG. 3 is a schematic diagram of a network architecture to which an embodiment of this application is applied.

Various embodiments may be applied to a network architecture shown in FIG. 3. In the network architecture, a first device is used as a source device, and a second device is used as a target device. The first device generates a two-dimensional index table, indexes and loads data corresponding to coordinates in the two-dimensional index table, and transmits the loaded file data to the second device, such that an end-to-end process of transmitting a file from the source device to the target device is implemented, to reduce duration required for traversal and improve transmission efficiency.

This example uses the standard HTTP1.1 protocol based on RFC2616, and may be further extended to application scenarios such as cloud storage, a web disk, and mobile transmission. This is not further limited herein. In this application, reliable transmission is performed on a large amount of data across regions based on a cloud or server cluster. A first device and a second device in this example each may be an independent device, or may be a device cluster including a plurality of devices. For ease of description, only a single device is used as an example for description in this application.

Figure 4A:
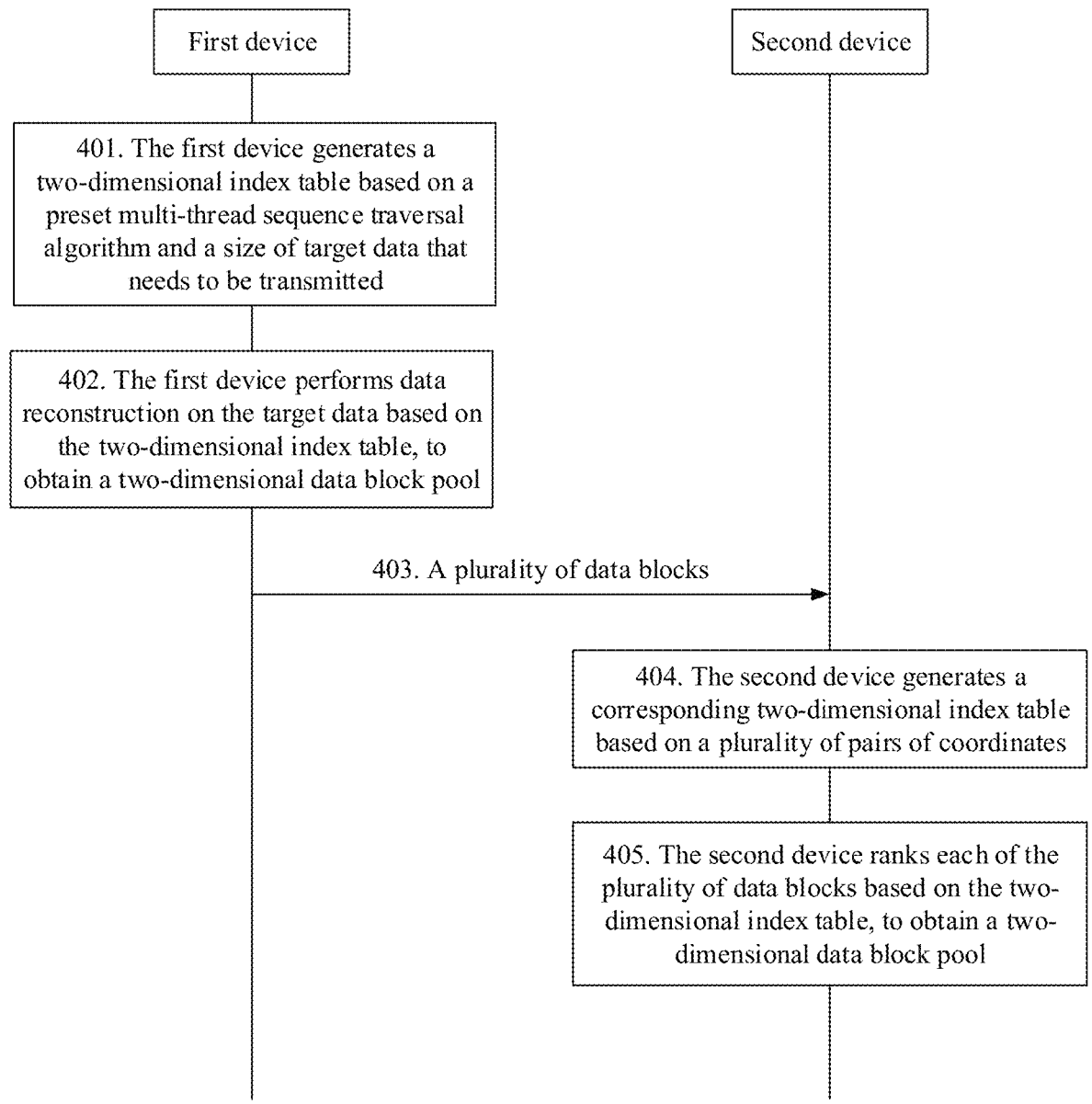
FIG. 4A is a schematic diagram of an embodiment of a data transmission method according to an embodiment of this application.

For ease of understanding, the following describes an example procedure in an embodiment. Referring to FIG. 4A, an embodiment of a data transmission method in this embodiment includes the following steps.

401. A first device generates a two-dimensional index table based on a preset multi-thread sequence traversal algorithm and a size of target data that needs to be transmitted.

The first device generates the two-dimensional index table based on the preset multi-thread sequence traversal algorithm and the size of the target data that needs to be transmitted. The two-dimensional index table is used to indicate a storage location of each piece of data in the target data.

Further, the first device first determines the size of the target data that needs to be transmitted to a second device, and then divides the target data into a plurality of data blocks with standard sizes based on the size of the target data, where sizes of all the data blocks are the same. The first device traverses all data blocks in the target data by using the preset multi-thread sequence traversal algorithm, to obtain a data directory, where the data directory includes at least one level of directory. The first device determines a horizontal coordinate and a vertical coordinate of the two-dimensional index table based on the size of the target data and the at least one level of directory, where the vertical coordinate of the two-dimensional index table is used to indicate a quantity of groups, and the horizontal coordinate of the two-dimensional index table is used to indicate a quantity of data blocks corresponding to each group. The first device generates the two-dimensional index table. The first device configures one or more threads for each level of directory, in other words, correspondingly allocates a thread to each group, where each thread is used to search a data block in a corresponding group; and determines a quantity of concurrent threads based on the quantity of groups and a preset thread pool.

It should be noted that the preset multi-thread sequence traversal algorithm is an improvement to an existing sequence traversal algorithm. The plurality of threads are introduced, such that a plurality of data blocks can be simultaneously traversed, to improve traversal efficiency. The target data may include one or more directories or a complex multi-level directory.

Figure 4B:
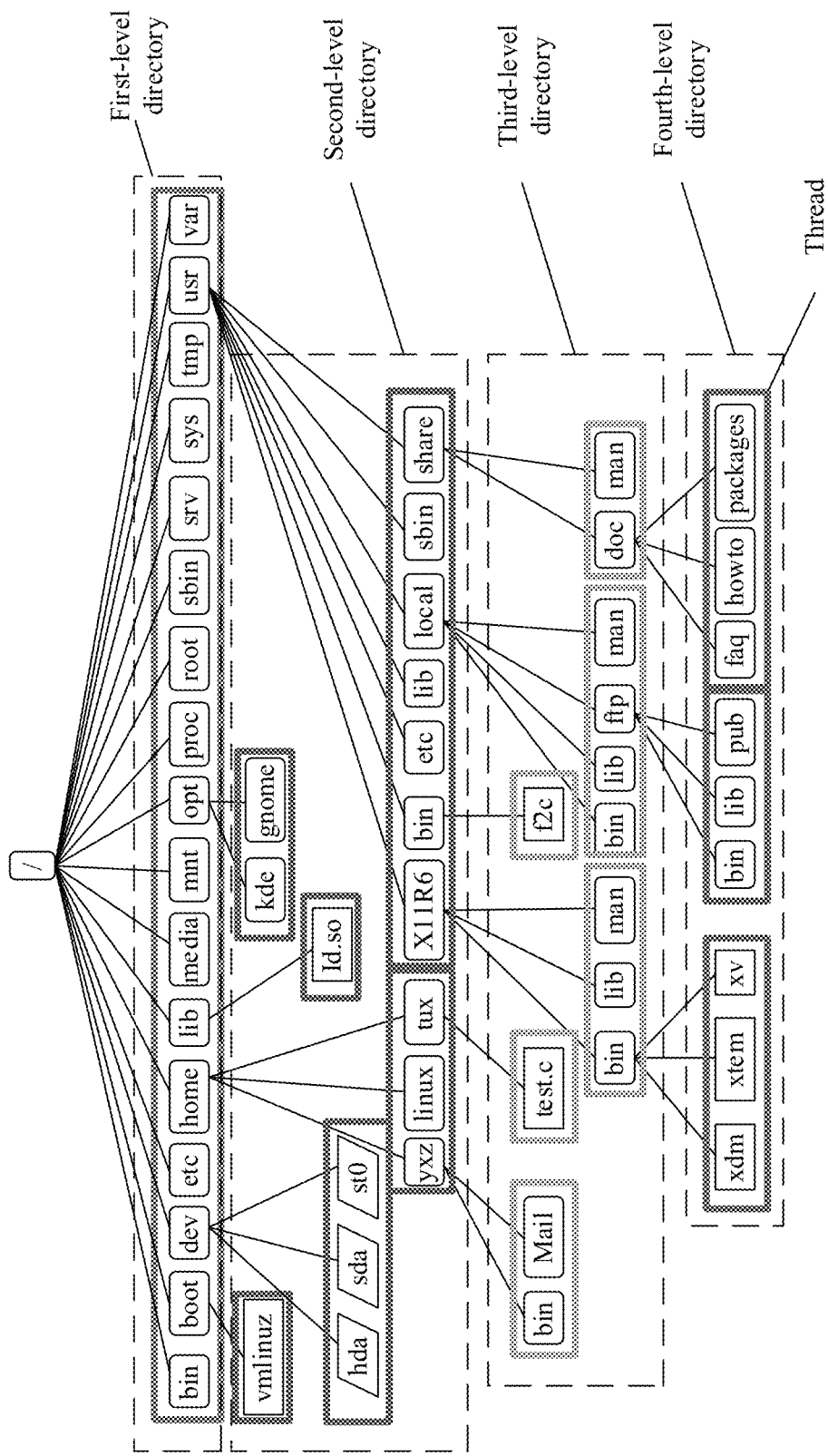
FIG. 4B is a schematic diagram of performing data traversal by using a multi-thread sequence traversal algorithm according to an embodiment of this application.
Figure 4C:
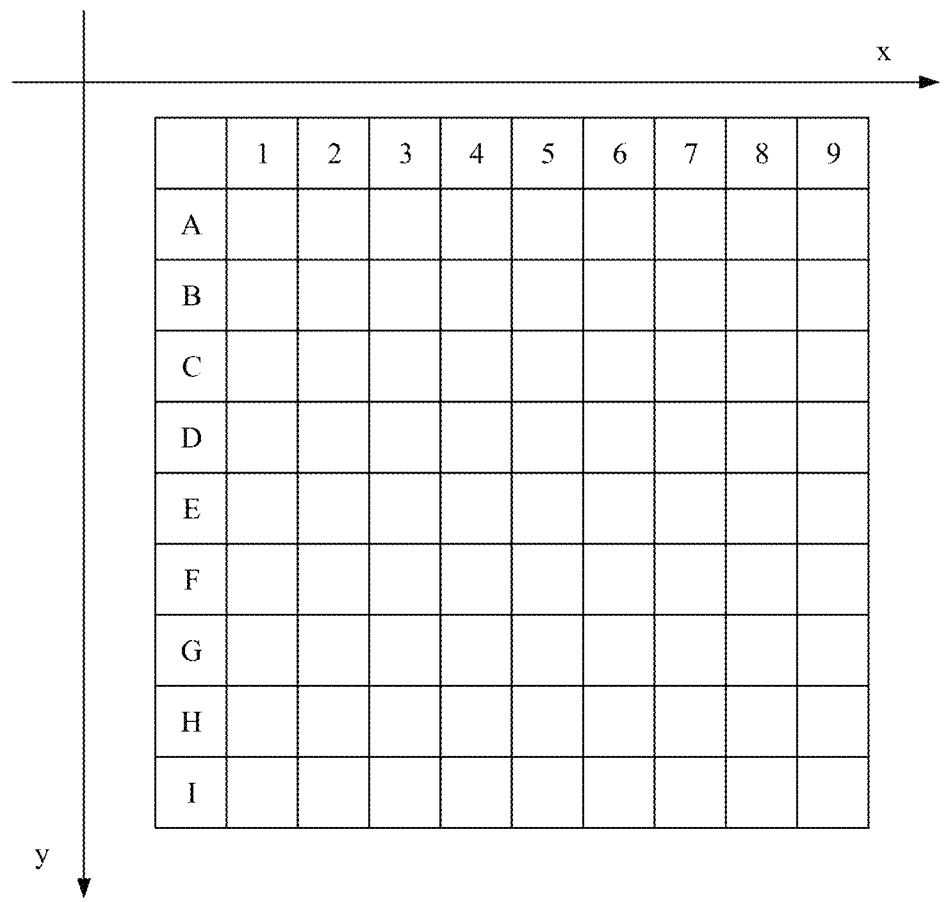
FIG. 4C is a schematic diagram of a generated two-dimensional index table according to an embodiment of this application.

For example, as shown in FIG. 4B, the data directory may include four levels of directories (shown in a dashed-line box): a first-level directory, a second-level directory, a third-level directory, and a fourth-level directory. Each level of directory corresponds to one or more data blocks, and each data block includes some data content. A thread (shown in a solid-line box) is configured for each level of directory. One thread is configured for the first-level directory, six threads are configured for the second-level directory, six threads are configured for the third-level directory, and three threads are configured for the fourth-level directory. Each thread is used to search the data block in the corresponding group for data content. The quantity of concurrent threads used to search the data block in the group is determined based on the size of the target data and the preset thread pool, where a largest quantity of threads is determined by a size of the preset thread pool. The two-dimensional index table is generated, to identify the horizontal coordinate and the vertical coordinate of the two-dimensional index table. For example, as shown in FIG. 4C, the vertical coordinate of the generated two-dimensional index table corresponds to nine groups that are identified by using letters A to I, and each group corresponds to nine data blocks that are identified by using numbers 1 to 9. The horizontal coordinate and the vertical coordinate may alternatively be identified in another manner. For example, the horizontal coordinate is identified by using a letter, and the vertical coordinate is identified by using a number. This is not further limited herein. It may be understood that one level of directory may include a plurality of subdirectories that are in a tree structure (not shown in FIG. 4B). This is not further limited herein.

402. The first device performs data reconstruction on the target data based on the two-dimensional index table, to obtain a two-dimensional data block pool.

The first device performs data reconstruction on the target data based on the two-dimensional index table, to obtain the two-dimensional data block pool, where the two-dimensional data block pool includes a plurality of data blocks, and each data block corresponds to one pair of coordinates in the two-dimensional index table.

Further, the first device divides, based on the generated two-dimensional index table, data that needs to be transmitted into data blocks, and reconstructs and sorts the data blocks to obtain the two-dimensional data block pool corresponding to the two-dimensional index table. Each data block in the two-dimensional data block pool corresponds to the coordinates in the two-dimensional index table. For example, in the two-dimensional index table shown in FIG. 4C, coordinates of a first data block are (1, A), and correspondingly, a data size may be 100 MB.

Each data block includes header field information and content information. The header field information includes at least coordinates and a check code of the data block, the coordinates are used to indicate a location of the data block in the two-dimensional data block pool, and the check code is used to check correctness of the data block. The content information includes data content indicated by the header field information, and the data content is included in the target data. The header field information may further include related information such as a target path, a source file name, a target file name, a file offset address, and a data block size.

It should be noted that to avoid network transmission congestion, a current network delay needs to be referenced when each data block is divided. A size of each data block is negatively correlated to a network delay. Further, as shown in Table 1, a larger network delay indicates a smaller size of a data block, such that a transmission rate is higher, and a quantity of transmission congestion situation is reduced. For example, the network delay and the size of the data block may meet a relation expression: the size of the data block=200/network delay. Alternatively, there may be another correspondence. This is not further limited herein.

TABLE 1

|  | Network delay (ms) | | | | |
| --- | --- | --- | --- | --- | --- |
|  | 400 | 200 | 100 | 50 | 20 |
| Data block size (MB) | 0.5 | 1 | 2 | 4 | 10 |

To improve overall transmission efficiency of a network, while it is ensured that no congestion occurs, to improve a single transmission rate as much as possible, the quantity of concurrent threads may be increased to improve transmission efficiency. The quantity of concurrent threads is positively correlated to the network bandwidth. A larger network bandwidth indicates a larger quantity of concurrent threads. In addition, the quantity of concurrent threads is also related to the size of the preset thread pool. A larger thread pool indicates a larger quantity of concurrent threads.

Figure 4D:
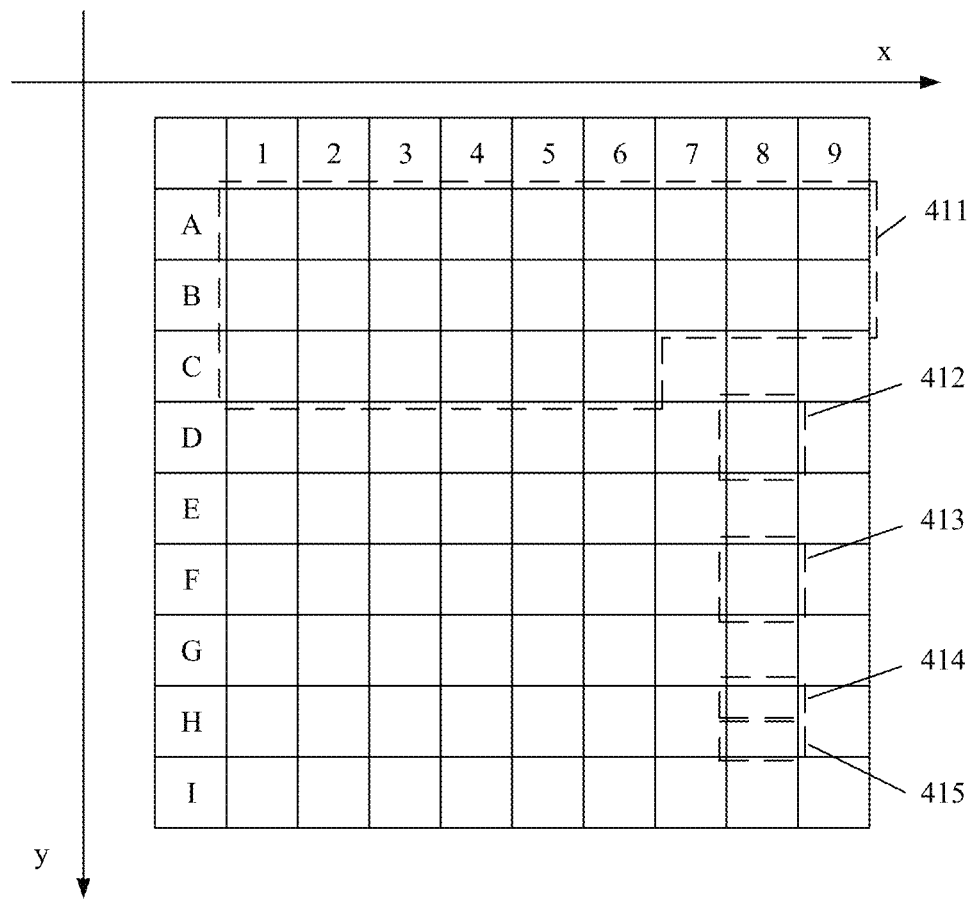
FIG. 4D is a schematic diagram of a relationship between a data block and a file in a two-dimensional data block pool according to an embodiment of this application.

It may be understood that data content of a plurality of data blocks may jointly form a large file, one data block may form a standard file, or a plurality of small files may form a data block. The standard file is a file whose size is the same as that of a specified data block, for example, a 1 MB file. The large file is a file whose size is greater than that of the specified data block, for example, a 1 GB file. The small file is a file whose size is less than that of the specified data block, for example, a 100 KB file. As shown in FIG. 4D, 26 data blocks form a file 1 (411), one data block forms a file 2 (412), one data block forms a file 3 (413), and one data block includes a file 4 (414) and a file 5 (415).

403. The first device obtains the plurality of data blocks through indexing by using the two-dimensional index table, and sends the plurality of data blocks to the second device.

The first device obtains the plurality of data blocks through indexing by using the two-dimensional index table, and sends the plurality of data blocks to the second device.

Further, the first device obtains each data block in the two-dimensional data block pool through indexing based on the two-dimensional index table, compresses each data block, and then sends, to the second device by using a network, a compressed data packet corresponding to each data block.

It should be noted that before the first device sends the data packet to the second device, the first device may obtain a corresponding data request. The data request is used to instruct the first device to send the target data to the second device. The target data may include one or more files. Details are not described herein.

404. The second device generates a corresponding two-dimensional index table based on a plurality of pairs of coordinates.

The second device obtains, based on the received data blocks, coordinates included in all the data blocks, where the coordinates included in all the data blocks are different; and sorts the plurality of pairs of obtained coordinates according to a preset rule, to obtain the corresponding two-dimensional index table.

It should be noted that before generating the two-dimensional index table, the second device needs to decompress the received data packets to obtain one or more data blocks.

405. The second device ranks each of the plurality of data blocks based on the two-dimensional index table, to obtain a two-dimensional data block pool.

The second device ranks each of the one or more data blocks based on the two-dimensional index table to obtain the two-dimensional data block pool.

Further, the second device quickly locates the data block by using two-dimensional coordinates (x,y) in the two-dimensional index table. Header field information of each data block carries one pair of coordinates, and files with different sizes or content of a specified location offset of a large file may be loaded onto content information of each data block, to facilitate a content check after data transmission. Setting a data block size algorithm and the quantity of concurrent threads is a key factor.

It should be noted that if a data block is a part of the large file, after receiving the data block, the second device automatically combines the data block with another associated data block to form the large file. Further, the second device determines a location of the data block in the large file based on first indication information carried in header field information of the data block, and combines the data block with the another associated data block to form the large file for separate storage.

If a data block includes a plurality of small files, after receiving the data block, the second device automatically divides the data block into the plurality of small files. Further, the second device determines a location of each small file in the data block based on second indication information carried in header field information of the data block, and separately stores the plurality of small files included in the data block.

In this embodiment, the first device reconstructs the target data that needs to be transmitted, to obtain the two-dimensional data block pool. The first device can quickly determine each data block through locating based on the two-dimensional data block pool, and send the two-dimensional data block pool to the second device, such that data traversal duration is reduced, to improve data search efficiency and improve data transmission efficiency.

Figure 5:
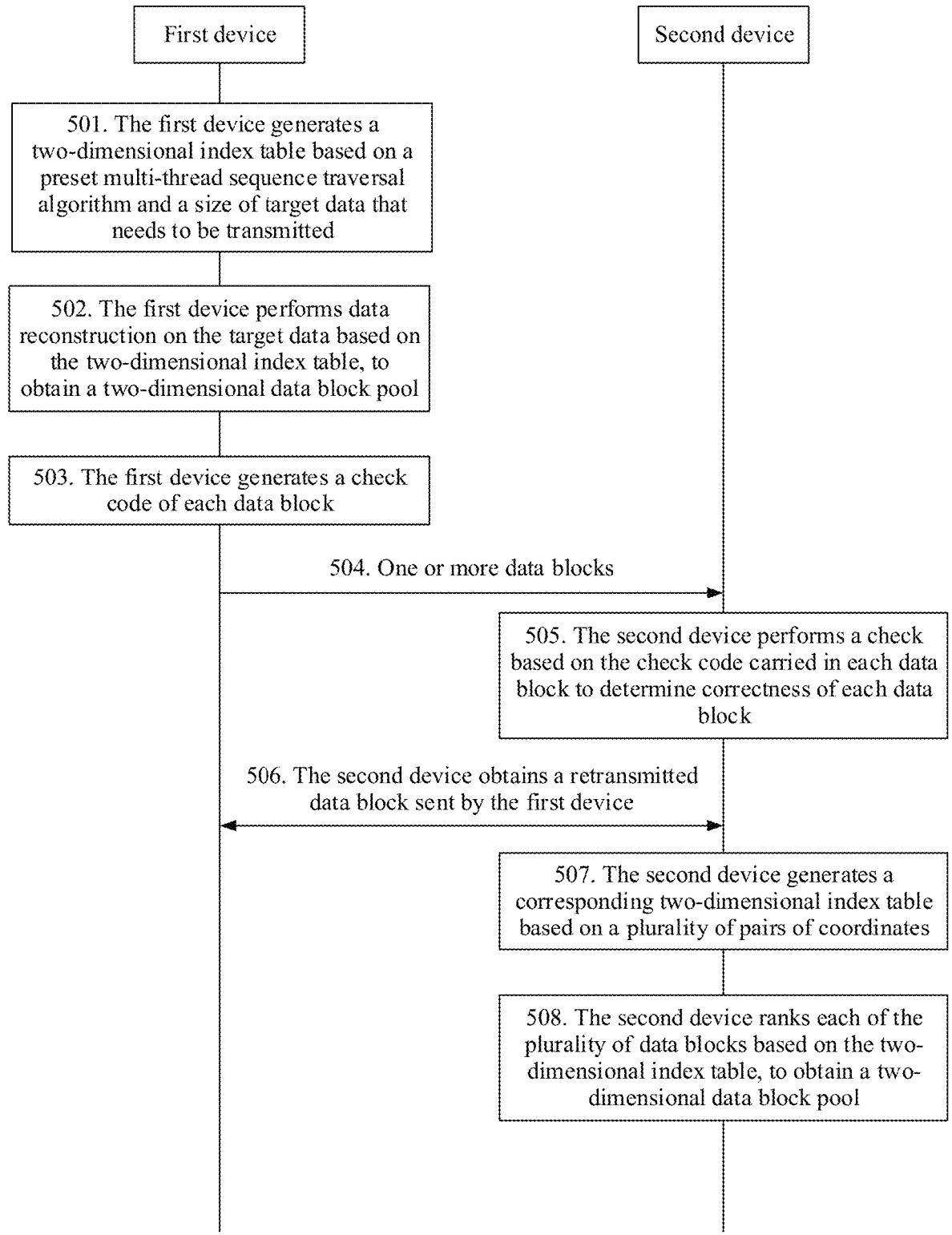
FIG. 5 is a schematic diagram of another embodiment of a data transmission method according to an embodiment of this application.

Referring to FIG. 5, another embodiment of a data transmission method in an embodiment of this application includes the following steps.

501. A first device generates a two-dimensional index table based on a preset multi-thread sequence traversal algorithm and a size of target data that needs to be transmitted.

The first device generates the two-dimensional index table based on the preset multi-thread sequence traversal algorithm and the size of the target data that needs to be transmitted, where the two-dimensional index table is used to indicate a storage location of each piece of data in the target data.

Further, the first device first determines the size of the target data that needs to be transmitted to a second device, and then divides the target data into a plurality of data blocks with standard sizes based on the size of the target data, where sizes of all the data blocks are the same. The first device traverses all data blocks in the target data by using the preset multi-thread sequence traversal algorithm, to obtain a data directory, where the data directory includes at least one level of directory. The first device determines a horizontal coordinate and a vertical coordinate of the two-dimensional index table based on the size of the target data and the at least one level of directory, where the vertical coordinate of the two-dimensional index table is used to indicate a quantity of groups, and the horizontal coordinate of the two-dimensional index table is used to indicate a quantity of data blocks corresponding to each group. The first device generates the two-dimensional index table. The first device configures one or more threads for each level of directory, in other words, correspondingly allocates a thread to each group, where each thread is used to search a data block in a corresponding group; and determines a quantity of concurrent threads based on the quantity of groups and a preset thread pool.

502. The first device performs data reconstruction on the target data based on the two-dimensional index table, to obtain a two-dimensional data block pool.

The first device performs data reconstruction on the target data based on the two-dimensional index table to obtain the two-dimensional data block pool, where the two-dimensional data block pool includes a plurality of data blocks, and each data block corresponds to one pair of coordinates in the two-dimensional index table.

Further, the first device divides, based on the generated two-dimensional index table, data that needs to be transmitted into data blocks, and reconstructs and sorts the data blocks to obtain the two-dimensional data block pool corresponding to the two-dimensional index table. Each data block in the two-dimensional data block pool corresponds to the coordinates in the two-dimensional index table.

Step 501 and step 502 are similar to step 401 and step 402. Details are not described herein again.

503. The first device generates a check code of each data block.

The first device generates the check code of each data block, where the check code is used to check correctness of each data block.

Further, in the embodiment of this application, the generated check code may be a check code generated by using a message-digest algorithm 5 (MD5), where the check code is used to perform a check to determine consistency of data content. The check code may alternatively be generated by using another existing algorithm. This is not further limited herein.

504. The first device obtains a plurality of data blocks through indexing by using the two-dimensional index table, and sends the plurality of data blocks to the second device.

The first device obtains the plurality of data blocks through indexing by using the two-dimensional index table, and sends the plurality of data blocks to the second device.

Further, the first device obtains each data block in the two-dimensional data block pool through indexing based on the two-dimensional index table, compresses each data block, and then sends, to the second device by using a network, a compressed data packet corresponding to each data block.

It should be noted that before the first device sends the data packet to the second device, the first device may obtain a corresponding data request. The data request is used to instruct the first device to send the target data to the second device. The target data may include one or more files. Details are not described herein.

505. The second device performs a check based on the check code carried in each data block, to determine correctness of each data block.

The second device performs the check based on the check code carried in each data block, to determine correctness of each data block. When all the received data blocks are correct, step 507 is performed. If one or more of the received data blocks is/are incorrect or fails/fail to be transmitted, step 506 is performed.

It should be noted that before performing a data check, the second device further needs to decompress the received compressed data packet, to obtain the plurality of data blocks.

506. The second device obtains a retransmitted data block sent by the first device.

The second device obtains the retransmitted data block retransmitted by the first device, where the retransmitted data block is a data block that fails to be transmitted or is incorrectly transmitted and that needs to be retransmitted.

Further, the second device sends a retransmission request to the first device, where the retransmission request carries target coordinates indicating a location of a target data block. The first device determines the location of the target data block in the two-dimensional data block pool based on the target coordinates. The first device re-obtains the target data block based on the location of the target data block. The first device sends the re-obtained target data block to the second device based on the received retransmission request, and then the second device checks the data block. If the check fails, retransmission continues to be performed; or if the check succeeds, subsequent steps continue to be performed.

It should be noted that if a transmission process is interrupted or abnormal, in other words, a piece of data is incorrectly transmitted or fails to be transmitted, transmission is resumed from an abnormal place or is started from the beginning, and consequently a time is consumed, to be specific, a data repair time is long, and repair efficiency is low. In the embodiment of this application, if one or more data blocks are incorrectly transmitted or fail to be transmitted, only the data block that is incorrectly transmitted or fails to be transmitted needs to be retransmitted, and another data block does not need to be retransmitted, such that a short time is consumed, and data repair efficiency is high.

507. The second device generates a corresponding two-dimensional index table based on a plurality of pairs of coordinates.

The second device obtains, based on the received data blocks, coordinates included in all the data blocks, where the coordinates included in all the data blocks are different; and sorts the plurality of pairs of obtained coordinates according to a preset rule, to obtain the corresponding two-dimensional index table.

It should be noted that before generating the two-dimensional index table, the second device needs to decompress the received data packets to obtain one or more data blocks.

508. The second device ranks each of the plurality of data blocks based on the two-dimensional index table, to obtain a two-dimensional data block pool.

The second device ranks each of the plurality of data blocks based on the two-dimensional index table to obtain the two-dimensional data block pool.

Further, the second device quickly locates the data block by using two-dimensional coordinates (x,y) in the two-dimensional index table. Header field information of each data block carries one pair of coordinates, and files with different sizes or content of a specified location offset of a large file may be loaded onto content information of each data block, to facilitate a content check after data transmission. Setting a data block size algorithm and the quantity of concurrent threads is a key factor.

It should be noted that if a data block is a part of the large file, after receiving the data block, the second device automatically combines the data block with another associated data block to form the large file. Further, the second device determines a location of the data block in the large file based on first indication information carried in header field information of the data block, and combines the data block with the another associated data block to form the large file for separate storage.

If a data block includes a plurality of small files, after receiving the data block, the second device automatically divides the data block into the plurality of small files. Further, the second device determines a location of each small file in the data block based on second indication information carried in header field information of the data block, and separately stores the plurality of small files included in the data block.

Step 507 and step 508 are similar to step 404 and step 405. Details are not described herein again.

In this embodiment, the first device reconstructs the target data that needs to be transmitted to obtain the two-dimensional data block pool, and sends the two-dimensional data block pool to the second device; and resends, to the second device, the data block that is incorrectly transmitted or fails to be transmitted. The first device can quickly determine each data block through locating, such that while data traversal duration is reduced, data block retransmission duration is reduced, and data repair efficiency is improved.

Figure 6:
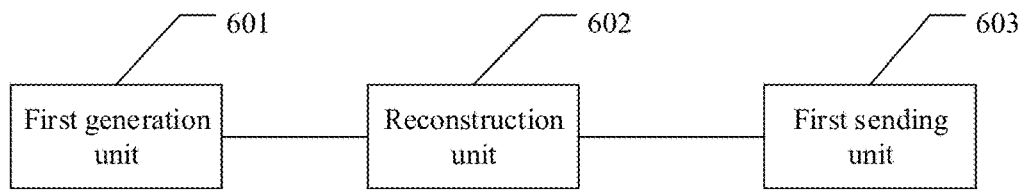
FIG. 6 is a schematic diagram of an embodiment of a first device according to an embodiment of this application.

The foregoing describes the data transmission method in the embodiments of this application, and the following describes devices in embodiments of this application. Referring to FIG. 6, an embodiment of a first device in an embodiment of this application includes:

a first generation unit 601, configured to generate a two-dimensional index table based on a preset multi-thread sequence traversal algorithm and a size of target data that needs to be transmitted, where the two-dimensional index table is used to indicate a storage location of each piece of data in the target data;

a reconstruction unit 602, configured to perform data reconstruction on the target data based on the two-dimensional index table to obtain a two-dimensional data block pool, where the two-dimensional data block pool includes a plurality of data blocks, and each data block corresponds to one pair of coordinates in the two-dimensional index table; and a first sending unit 603, configured to: obtain the plurality of data blocks through indexing by using the two-dimensional index table, and send the plurality of data blocks to a second device.

In this embodiment, the first device reconstructs the target data that needs to be transmitted to obtain the two-dimensional data block pool, and sends the two-dimensional data block pool to the second device, such that the second device can quickly determine each data block through locating, to reduce data traversal duration and improve data search efficiency.

Figure 7:
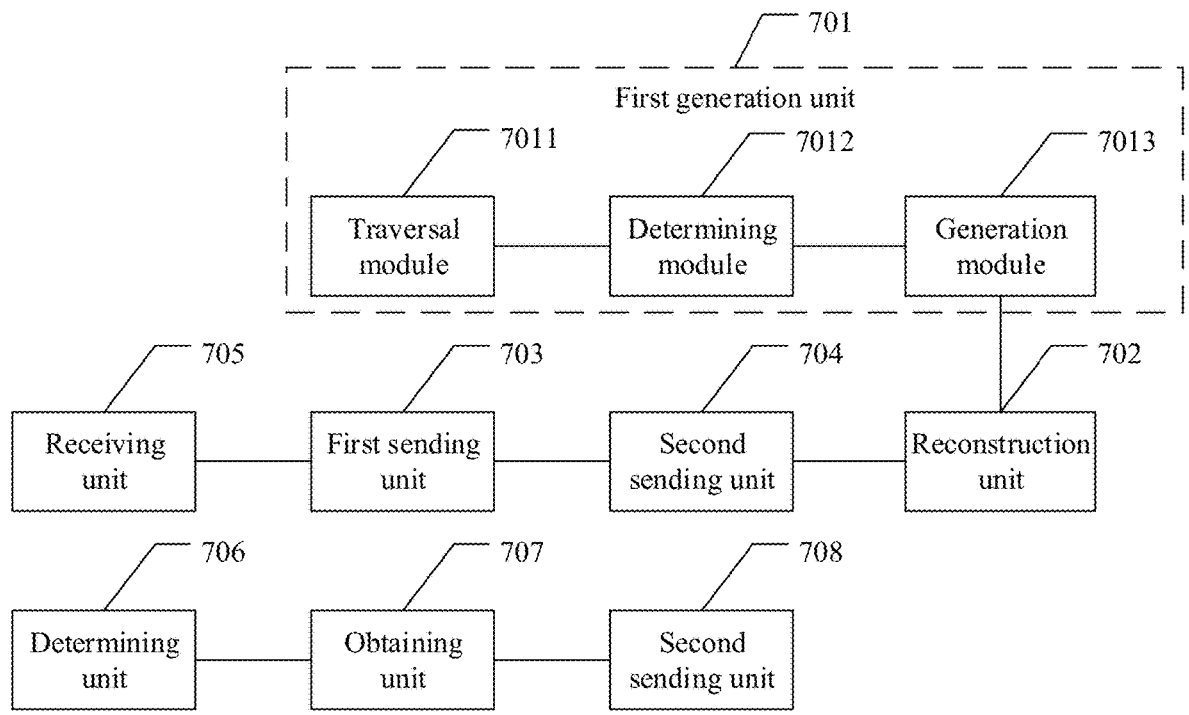
FIG. 7 is a schematic diagram of another embodiment of a first device according to an embodiment of this application.

Referring to FIG. 7, another embodiment of a first device in an embodiment of this application includes:

a first generation unit 701, configured to generate a two-dimensional index table based on a preset multi-thread sequence traversal algorithm and a size of target data that needs to be transmitted, where the two-dimensional index table is used to indicate a storage location of each piece of data in the target data;

a reconstruction unit 702, configured to perform data reconstruction on the target data based on the two-dimensional index table to obtain a two-dimensional data block pool, where the two-dimensional data block pool includes a plurality of data blocks, and each data block corresponds to one pair of coordinates in the two-dimensional index table; and a first sending unit 703, configured to: obtain the plurality of data blocks through indexing by using the two-dimensional index table, and send the plurality of data blocks to a second device.

In one implementation, the first generation unit 701 includes:

a traversal module 7011, configured to traverse, based on the preset multi-thread sequence traversal algorithm, the target data that needs to be transmitted, to obtain a data directory, where the data directory includes at least one level of directory;

a determining module 7012, configured to determine a horizontal coordinate and a vertical coordinate of the two-dimensional index table based on the size of the target data and the at least one level of directory, where the vertical coordinate of the two-dimensional index table is used to indicate a quantity of groups of the target data, and the horizontal coordinate of the two-dimensional index table is used to indicate a quantity of data blocks corresponding to each group; and a generation module 7013, configured to generate the two-dimensional index table.

In a feasible implementation, a size of each data block is negatively correlated to a network delay; and a quantity of threads is positively correlated to a network bandwidth.

In one implementation, the first device further includes:

a second generation unit 704, configured to generate a check code of each data block, where the check code is used to check correctness of each data block.

In a feasible implementation, the data block includes header field information and content information.

The header field information includes at least coordinates and the check code of the data block, and the coordinates are used to indicate a location of the data block in the two-dimensional data block pool.

The content information includes data content indicated by the header field information, and the data content is included in the target data.

In one implementation, the first device further includes:

a receiving unit 705, configured to: if a first data block fails to be transmitted, receive a retransmission request sent by the second device, where the retransmission request includes first coordinates of the first data block;

a determining unit 706, configured to determine a location of the first data block in the two-dimensional data block pool based on the first coordinates;

an obtaining unit 707, configured to re-obtain the first data block based on the location of the first data block; and a second sending unit 708, configured to send the re-obtained first data block to the second device.

In one implementation, when the target data includes a large file, and the large file includes a plurality of target data blocks, header field information of the target data block further includes first indication information, where the first indication information is used to indicate a location of each target data block in the large file, and the large file is formed after transmission is completed.

In one implementation, when the target data includes a plurality of small files, and the plurality of small files form a target data block, header field information of the target data block further includes second indication information, where the second indication information is used to indicate a location of each small file included in the target data block, and the small files are obtained through division after transmission is completed.

Figure 8:
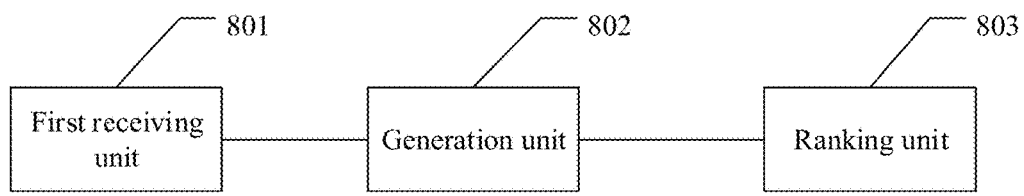
FIG. 8 is a schematic diagram of an embodiment of a second device according to an embodiment of this application.

Referring to FIG. 8, an embodiment of a second device in an embodiment of this application includes:

a first receiving unit 801, configured to receive a plurality of data blocks sent by a first device, where each data block includes one pair of coordinates;

a generation unit 802, configured to generate a corresponding two-dimensional index table based on a plurality of pairs of coordinates, where the two-dimensional index table is used to indicate storage locations of the plurality of data blocks; and a ranking unit 803, configured to rank each of the plurality of data blocks based on the two-dimensional index table, to obtain a two-dimensional data block pool, where the two-dimensional data block pool is target data that needs to be transmitted.

In this embodiment, the second device generates the two-dimensional index table based on the received data block, and ranks the received data block based on the two-dimensional index table, to obtain the two-dimensional data block pool. The two-dimensional data block pool includes data blocks corresponding to different coordinates, such that data traversal duration of the second device is reduced, and data search efficiency is improved.

Figure 9:
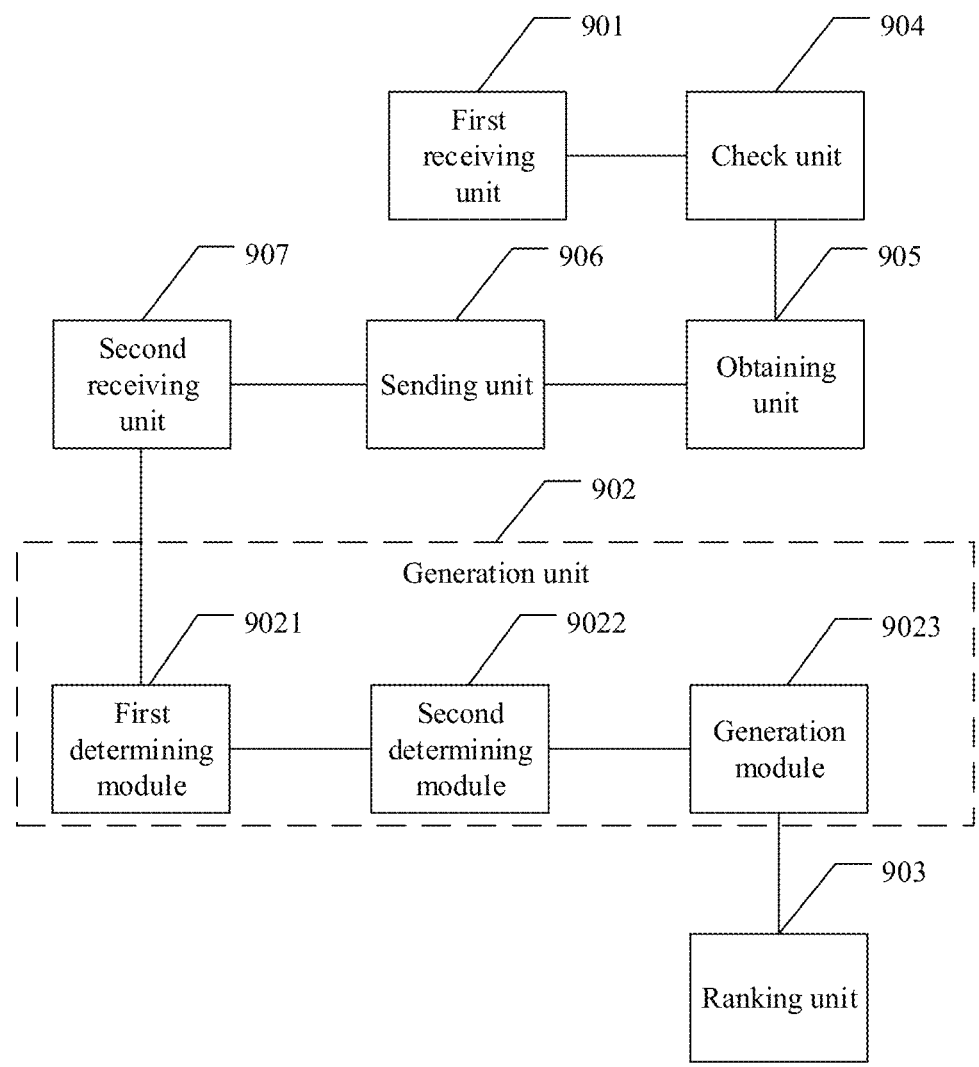
FIG. 9 is a schematic diagram of another embodiment of a second device according to an embodiment of this application.

Referring to FIG. 9, another embodiment of a second device in an embodiment includes:

a first receiving unit 901, configured to receive a plurality of data blocks sent by a first device, where each data block includes one pair of coordinates;

a generation unit 902, configured to generate a corresponding two-dimensional index table based on a plurality of pairs of coordinates, where the two-dimensional index table is used to indicate storage locations of the plurality of data blocks; and a ranking unit 903, configured to rank each of the plurality of data blocks based on the two-dimensional index table, to obtain a two-dimensional data block pool, where the two-dimensional data block pool is target data that needs to be transmitted.

In one implementation, the generation unit 902 includes:

a first determining module 9021, configured to determine a vertical coordinate of the two-dimensional index table based on a second value in the coordinates, where the vertical coordinate of the two-dimensional index table is used to indicate a quantity of groups of the target data;

a second determining module 9022, configured to determine a horizontal coordinate of the two-dimensional index table based on a first value in the coordinates, where the horizontal coordinate of the two-dimensional index table is used to indicate a quantity of data blocks corresponding to each group; and a generation module 9023, configured to generate the corresponding two-dimensional index table based on the horizontal coordinate and the vertical coordinate.

In one implementation, a size of each data block is negatively correlated to a network delay.

The quantity of threads is positively correlated to a network bandwidth.

In one implementation, the second device further includes:

a check unit 904, configured to perform a check based on a check code carried in each data block, to determine correctness of each data block.

In one implementation, the data block includes header field information and content information.

The header field information includes at least coordinates and the check code of the data block, and the coordinates are used to indicate a location of the data block in the two-dimensional data block pool.

The content information includes data content indicated by the header field information, and the data content is included in the target data.

In one implementation, the second device further includes:

an obtaining unit 905, configured to: if a first data block fails to be transmitted, determine first coordinates of the first data block;

a sending unit 906, configured to send a retransmission request to the first device, where the retransmission request includes the first coordinates; and a second receiving unit 907, configured to receive the first data block resent by the first device.

The first device and the second device in the embodiments of this application are respectively described in detail above from a perspective of a modular function entity in FIG. 6 to FIG. 9, and devices in embodiments of this application are described in detail below from a perspective of hardware processing.

Figure 10:
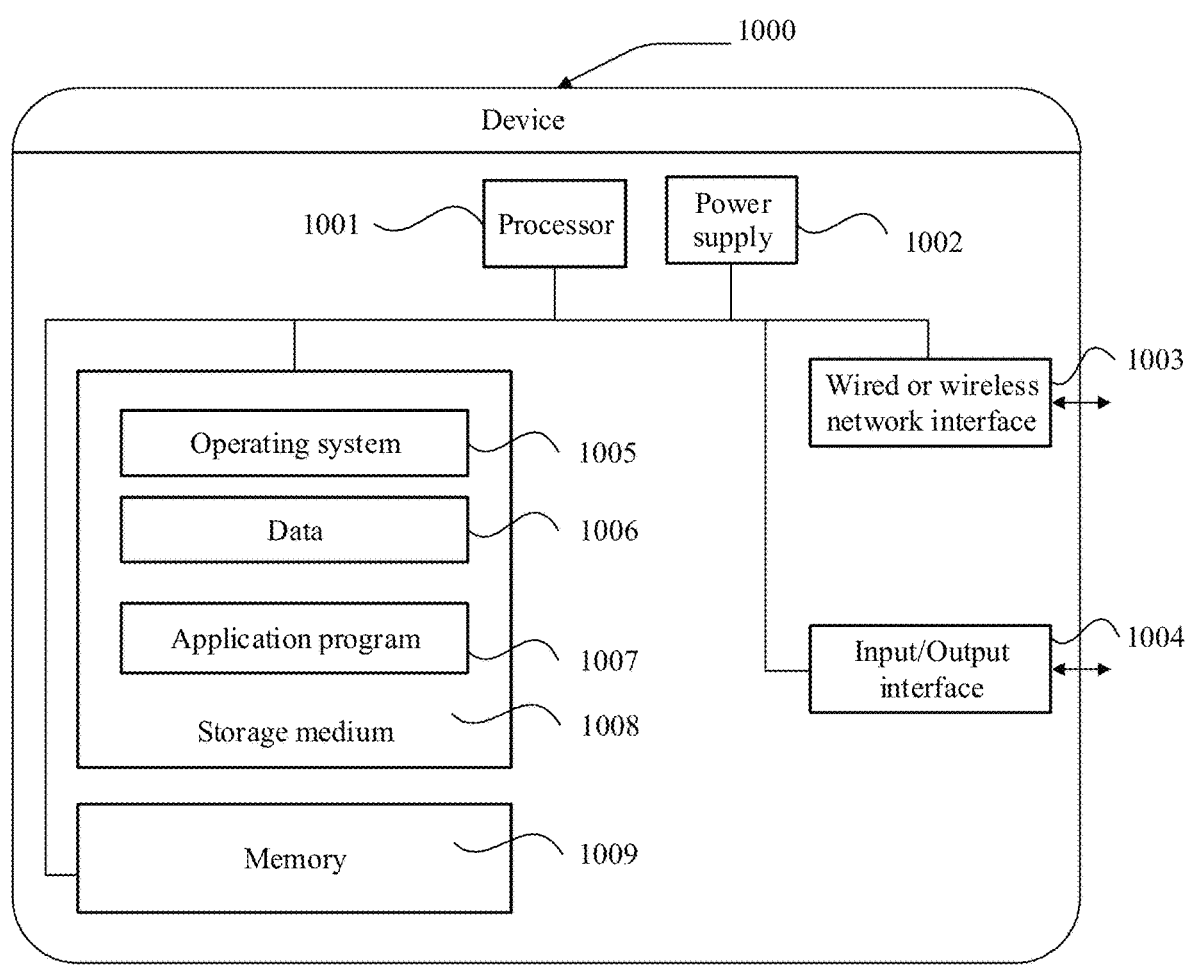
FIG. 10 is a schematic diagram of another embodiment of a device according to an embodiment of this application.

FIG. 10 is a schematic structural diagram of a device 1000 according to an embodiment of this application. The device may be a server. The device 1000 may differ greatly due to different configurations or performance, and may include one or more processors (CPU) 1001 (for example, one or more processors), a memory 1009, and one or more storage media 1008 (for example, one or more mass storage devices) that store an application program 1007 or data 1006. The memory 1009 and the storage medium 1008 may be transient storages or persistent storages. The program stored in the storage medium 1008 may include one or more modules (not shown in the figure), and each module may include a series of instruction operations on the device. Further, the processor 1001 may be configured to: communicate with the storage medium 1008, and perform, on the device 1000, the series of instruction operations in the storage medium 1008.

The device 1000 may further include one or more power supplies 1002, one or more wired or wireless network interfaces 1003, one or more input/output interfaces 1004, and/or one or more operating systems 1005, for example, Windows Serve, Mac OS X, Unix, Linux, and FreeBSD. Persons skilled in the art may understand that a structure of the device shown in FIG. 10 does not constitute a limitation on the device, and the device may include more or fewer components than those shown in the figure, combine some components, or have different component arrangements.

The following describes the components of the device in detail with reference to FIG. 10.

The processor 1001 is a control center of the device, and may perform processing according to a specified data transmission method. The processor 1001 is coupled to all parts of the entire device by using various interfaces and lines, and performs various functions of the device and data processing by running or executing a software program and/or a module stored in the memory 1009 and invoking data stored in the memory 1009, to implement data transmission.

The memory 1009 may be configured to store the software program and the module. The processor 1001 executes various function applications of the device 1000 and data processing by running the software program and the module stored in the memory 1009. The memory 1009 may mainly include a program storage area and a data storage area. The program storage area may store an operating system, an application program required by at least one function (for example, generation of a two-dimensional data block pool), and the like. The data storage area may store data (for example, generation of a two-dimensional index table) created based on use of the device, and the like. In addition, the memory 1009 may include a high-speed random access memory, and may further include a nonvolatile memory, for example, at least one magnetic disk storage device, a flash memory device, or another volatile solid-state storage device. A program of the data transmission method provided in the embodiment of this application and a received data flow are stored in the memory. When the program and the received data flow need to be used, the processor 1001 invokes the program and the received data flow from the memory 1009.

Figure 11:
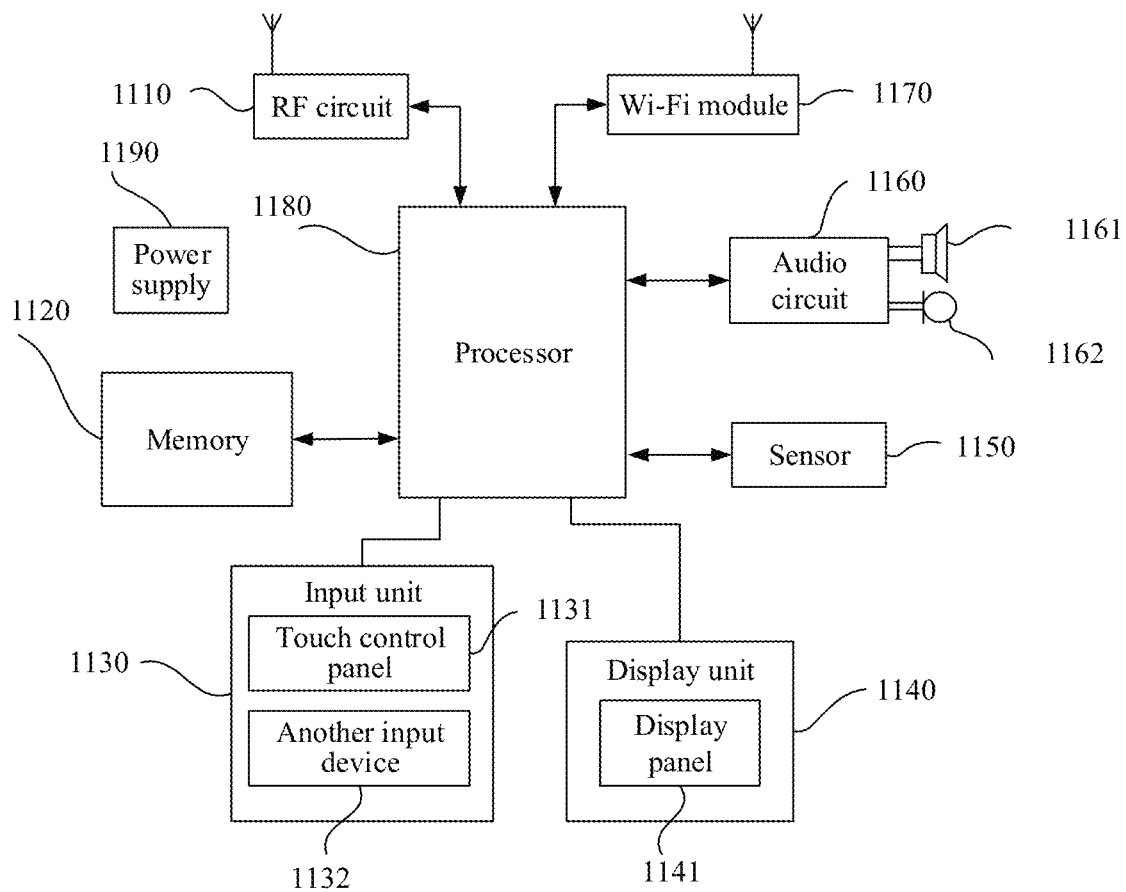
FIG. 11 is a schematic diagram of another embodiment of a device according to an embodiment of this application.

The following describes the components of the device in detail with reference to FIG. 11. The device may be a terminal device.

FIG. 11 is a block diagram of a partial structure of a device according to an embodiment of this application. Referring to FIG. 11, the terminal device includes components such as a radio frequency (RF) circuit 1110, a memory 1120, an input unit 1130, a display unit 1140, a sensor 1150, an audio circuit 1160, a wireless fidelity (WIFI) module 1170, and a processor 1180. Persons skilled in the art may understand that a structure of the terminal device shown in FIG. 11 does not constitute a limitation on the terminal device, and the terminal device may include more or fewer components than those shown in the figure, combine some components, or have different component arrangements.

The processor 1180 is a control center of the terminal device. In the embodiment of this application, the processor 1180 may generate a two-dimensional index table based on a preset multi-thread sequence traversal algorithm, reconstruct target data based on the two-dimensional index table to obtain a two-dimensional data block pool, and send each data block in the two-dimensional data block pool to another device coupled to the processor 1180.

The RF circuit 1110 is coupled to the processor 1180 by using a bus, and is responsible for sending data to the Internet or receiving data from the Internet. The RF circuit 1110 may be further configured to: receive and send signals in an information receiving/sending process, for example, send each data block in the two-dimensional data block pool to a second device. In addition, after receiving a retransmission request sent by the second device, a first device sends the retransmission request to the processor 1180 for processing. Usually, the RF circuit 1110 includes but is not limited to an antenna, at least one amplifier, a transceiver, a coupler, a low noise amplifier (LNA), a duplexer, and the like. In addition, the RF circuit 1110 may further communicate with a network and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), an e-mail, a short message service (SMS), and the like.

The memory 1120 may be configured to store a software program and a module. The processor 1180 executes various function applications of the terminal device and data processing by running the software program and the module stored in the memory 1120. The memory 1120 may mainly include a program storage area and a data storage area. The program storage area may store an operating system, an application program required by at least one function (for example, generation of a two-dimensional index table based on a preset multi-thread sequence traversal algorithm), and the like. The data storage area may store data (for example, a two-dimensional data block pool) created based on use of the terminal device, and the like. In addition, the memory 1120 may include a high-speed random access memory, and may further include a nonvolatile memory, for example, at least one magnetic disk storage device, a flash memory device, or another volatile solid-state storage device.

It may be clearly understood by persons skilled in the art that for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the apparatus embodiment described above is merely an example. For example, division into the units is merely logical function division and may be other division in an actual application. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, function units in the embodiments of this application may be integrated into one processing unit, each of the units may exist alone physically, or two or more units are integrated into one unit. The foregoing integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are only intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
   generating, by a first device, a two-dimensional index table based on a preset algorithm and information regarding target data to be transmitted, wherein the two-dimensional index table is configured to indicate a storage location of each piece of data in the target data;
   performing, by the first device, data reconstruction on the target data based on the two-dimensional index table to obtain a two-dimensional data block pool, wherein the two-dimensional data block pool comprises a plurality of data blocks, and each data block corresponds to one pair of coordinates in the two-dimensional index table;
   obtaining, by the first device, the plurality of data blocks through indexing by using the two-dimensional index table, and
   sending, by the first device, the plurality of data blocks to a second device.

2. The method according to claim 1, wherein the preset algorithm is a present multi-thread sequence traversal algorithm, and the information regarding the target data indicates a size of the target data.

3. The method according to claim 2, wherein the two-dimensional index table is generated by:
   traversing, by the first device based on the preset multi-thread sequence traversal algorithm, the target data to be transmitted, to obtain a data directory, wherein the data directory comprises at least one level of directory;
   determining, by the first device, a horizontal coordinate and a vertical coordinate of the two-dimensional index table based on the size of the target data and the at least one level of directory, wherein the vertical coordinate of the two-dimensional index table indicates a quantity of groups of the target data, and the horizontal coordinate of the two-dimensional index table indicates a quantity of data blocks corresponding to each group; and
   generating, by the first device, the two-dimensional index table.

4. The method according to claim 1, wherein
   a size of each data block is negatively correlated to a network delay; and
   a quantity of threads is positively correlated to a network bandwidth.

5. The method according to claim 1, wherein the method further comprises:
   generating, by the first device, a check code of each data block, wherein the check code is used to check correctness of each data block after the first device performs data reconstruction on the target data based on the two-dimensional index table, and before the first device obtains the plurality of data blocks through indexing by using the two-dimensional index table, and
   sending, by the first device, the plurality of data blocks to a second device.

6. The method according to claim 5, wherein
   each data block comprises header field information and content information;
   the header field information comprises at least coordinates and a check code of the data block, and the coordinates are used to indicate a location of the data block in the two-dimensional data block pool; and
   the content information comprises data content indicated by the header field information, and the data content is comprised in the target data.

7. The method according to claim 6, wherein the method further comprises:
   receiving, by the first device, a retransmission request sent by the second device when a first data block fails to be transmitted, wherein the retransmission request comprises first coordinates of the first data block;
   determining, by the first device, a location of the first data block in the two-dimensional data block pool based on the first coordinates;
   re-obtaining, by the first device, the first data block based on the location of the first data block; and
   sending, by the first device, the first data block to the second device.

8. The method according to claim 6, wherein
   header field information of a target data block comprises first indication information when the target data comprises a large file, and the large file comprises a plurality of target data blocks, wherein the first indication information indicates a location of each of the plurality of target data blocks in the large file, and the large file is formed after transmission is completed.

9. The method according to claim 6, wherein
   header field information of the target data block comprises second indication information when the target data comprises a plurality of small files, and the plurality of small files form the target data block, wherein the second indication information indicates a location of each small file of the plurality of small files, and the small files are obtained through division after transmission is completed.

10. A device:
   a processor; and a computer-readable storage medium storing a program to be executed by the processor, the program including instructions that when executed by the processor cause the processor to:

generate a two-dimensional index table based on a preset algorithm and information regarding target data be transmitted, wherein the two-dimensional index table is used to indicate a storage location of each piece of data in the target data;

perform data reconstruction on the target data based on the two-dimensional index table to obtain a two-dimensional data block pool, wherein the two-dimensional data block pool comprises a plurality of data blocks, and each data block corresponds to one pair of coordinates in the two-dimensional index table;

obtain the plurality of data blocks through indexing by using the two-dimensional index table; and send the plurality of data blocks to a second device.

11. The method according to claim 10, wherein the preset algorithm is a present multi-thread sequence traversal algorithm, and the information regarding the target data indicates a size of the target data.

12. The device according to claim 11, wherein the instructions also cause the processor to:

traverse, based on the preset multi-thread sequence traversal algorithm, the target data to be transmitted, to obtain a data directory, wherein the data directory comprises at least one level of directory;

determine a horizontal coordinate and a vertical coordinate of the two-dimensional index table based on the size of the target data and the at least one level of directory, wherein the vertical coordinate of the two-dimensional index table indicates a quantity of groups of the target data, and the horizontal coordinate of the two-dimensional index table indicates a quantity of data blocks corresponding to each group; and generate the two-dimensional index table.

13. A device:

a processor; and a computer-readable storage medium storing a program to be executed by the processor, the program including instructions that when executed by the processor cause the processor to:

receive a plurality of data blocks sent by a first device, wherein each data block comprises one pair of coordinates;

generate a corresponding two-dimensional index table based on a plurality of pairs of coordinates, wherein the two-dimensional index table indicates storage locations of the plurality of data blocks; and rank each of the plurality of data blocks based on the two-dimensional index table, to obtain a two-dimensional data block pool, wherein the two-dimensional data block pool comprises target data that needs to be transmitted.

14. The device according to claim 13, wherein the instructions also cause the processor to:

determine a vertical coordinate of the two-dimensional index table based on a second value in the coordinates, wherein the vertical coordinate of the two-dimensional index table indicates a quantity of groups of the target data;

determine a horizontal coordinate of the two-dimensional index table based on a first value in the coordinates, wherein the horizontal coordinate of the two-dimensional index table indicates a quantity of data blocks corresponding to each group; and generate the corresponding two-dimensional index table based on the horizontal coordinate and the vertical coordinate.

15. The device according to claim 14, wherein a size of each data block is negatively correlated to a network delay; and a quantity of threads is positively correlated to a network bandwidth.

16. The device according to claim 13, wherein the instructions also cause the processor to perform a check based on a check code carried in each data block, to determine correctness of each data block.

17. The device according to claim 16, wherein each data block comprises header field information and content information;

the header field information comprises at least coordinates and the check code of the data block, and the coordinates indicate a location of the data block in the two-dimensional data block pool; and the content information comprises data content indicated by the header field information, and the data content is comprised in the target data.

18. The device according to claim 17, wherein the instructions also cause the processor to:

determine first coordinates in a first data block when the first data block fails to be transmitted;

send a retransmission request to the first device, wherein the retransmission request comprises the first coordinates; and receive the first data block resent by the first device.

19. The device according to claim 17, wherein header field information of a target data block comprises first indication information when the target data comprises a large file, and the large file comprises a plurality of target data blocks, wherein the first indication information is used to indicate a location of each of the plurality of target data blocks in the large file, and the large file is formed after transmission is completed.

20. The device according to claim 17, wherein header field information of a target data block comprises second indication information when the target data comprises a plurality of small files, and the plurality of small files form the target data block, wherein the second indication information is used to indicate a location of each small file of the plurality of small files, and the small files are obtained through division after transmission is completed.

\* \* \* \* \*

UNITED STATES PATENT AND TRADEMARK OFFICE
CERTIFICATE OF CORRECTION

PATENT NO. : 11,476,977 B2
APPLICATION NO. : 17/073438
DATED : October 18, 2022
INVENTOR(S) : Yong Fan It is certified that error appears in the above-identified patent and that said Letters Patent is hereby corrected as shown below:

In the Claims

In Column 24, Line 58, in Claim 9, delete "the" and insert -- a --.

In Column 24, Line 66, in Claim 10, delete "device:" and insert -- device comprising: --.

In Column 25, Line 6, in Claim 10, delete "data be" and insert -- data to be --.

In Column 25, Line 20, in Claim 11, delete "method" and insert -- device --.

In Column 25, Line 39, in Claim 13, delete "device:" and insert -- device comprising: --.

Signed and Sealed this
Third Day of January, 2023

Katherine Kelly Vidal
*Director of the United States Patent and Trademark Office*